(12) United States Patent
Kawaguchi et al.

(10) Patent No.: US 10,544,727 B2
(45) Date of Patent: Jan. 28, 2020

(54) INTERCOOLER

(71) Applicant: DENSO CORPORATION, Kariya, Aichi-pref. (JP)

(72) Inventors: Takefumi Kawaguchi, Kariya (JP); Isao Kuroyanagi, Kariya (JP); Masaki Harada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/089,016

(22) PCT Filed: Mar. 10, 2017

(86) PCT No.: PCT/JP2017/009769
§ 371 (c)(1),
(2) Date: Sep. 27, 2018

(87) PCT Pub. No.: WO2017/169666
PCT Pub. Date: Oct. 5, 2017

(65) Prior Publication Data
US 2019/0055879 A1   Feb. 21, 2019

(30) Foreign Application Priority Data
Mar. 31, 2016   (JP) .................................. 2016-070719

(51) Int. Cl.
*F02B 29/04* (2006.01)
*F28D 9/00* (2006.01)

(52) U.S. Cl.
CPC .......... *F02B 29/0462* (2013.01); *F02B 29/04* (2013.01); *F02B 29/0443* (2013.01); *F28D 9/0043* (2013.01); *Y02T 10/146* (2013.01)

(58) Field of Classification Search
CPC .. F02B 29/04; F02B 29/0443; F02B 29/0462; F28D 9/0043; Y02T 10/146
See application file for complete search history.

(56) References Cited

U.S. PATENT DOCUMENTS 6,688,292 B2   2/2004   Ruppel et al.
7,104,062 B2   9/2006   Amaral
(Continued)

FOREIGN PATENT DOCUMENTS

DE   102006008826 A1   8/2007
JP      2002332920 A   11/2002
(Continued)

*Primary Examiner* — Brandon D Lee
(74) *Attorney, Agent, or Firm* — Harness, Dickey & Pierce, P.L.C.

(57) ABSTRACT

An intercooler includes a heat exchanger that has a first heat exchange portion through which a first heat exchange medium flows and a second heat exchange portion through which a second heat exchange medium flows. The first heat exchange medium flowing through the first heat exchange portion cools the supercharged intake air by exchanging heat with the supercharged intake air. The second heat exchange medium flowing through the second heat exchange portion cools the supercharged intake air by exchanging heat with the supercharged intake air. The heat exchanger includes an inner fin configured to enhance the heat exchange between the supercharged intake air and the first heat exchange medium. The heat exchanger includes a boiling suppression portion configured to suppress a boiling of the first heat exchange medium flowing in an upstream part, in a flow direction of the supercharged intake air, of the first heat exchange portion.

7 Claims, 11 Drawing Sheets

(56) References Cited

U.S. PATENT DOCUMENTS

| | | |
|---|---|---|
| 8,191,365 B2 | 6/2012 | Quinn et al. |
| 2007/0000457 A1 | 1/2007 | Guerrero et al. |
| 2010/0155014 A1 | 6/2010 | Guerrero et al. |
| 2013/0276763 A1 | 10/2013 | Eilemann et al. |
| 2016/0326949 A1 | 11/2016 | Harada et al. |
| 2016/0356205 A1* | 12/2016 | Braun ................ F02B 29/0443 |

FOREIGN PATENT DOCUMENTS

| | | |
|---|---|---|
| JP | 2010144979 A | 7/2010 |
| JP | 2011190742 A | 9/2011 |
| JP | 2015004332 A | 1/2015 |
| JP | 2015145667 A | 8/2015 |
| JP | 2015155692 A | 8/2015 |
| JP | 2016023556 A | 2/2016 |
| WO | WO-2004044401 A1 | 5/2004 |
| WO | WO-2004085810 A2 | 10/2004 |
| WO | WO-2012080508 A1 | 6/2012 |

\* cited by examiner

INTERCOOLER

CROSS REFERENCE TO RELATED APPLICATIONS

This application is a U.S. National Phase Application under 35 U.S.C. 371 of International Application No. PCT/JP2017/009769 filed on Mar. 10, 2017. This application is based on and claims the benefit of priority from Japanese Patent Application No. 2016-070719 filed on Mar. 31, 2016. The entire disclosures of all of the above applications are incorporated herein by reference.

TECHNICAL FIELD

The present disclosure relates to an intercooler for cooling intake air supercharged by a supercharger.

BACKGROUND ART

Conventionally, an intercooler includes a high-temperature heat exchange portion in which supercharged air supercharged to an engine by a supercharger is cooled by using first cooling water, and a low-temperature heat exchange portion in which the supercharged air is cooled by using second cooling water whose temperature is lower than that of the first cooling water. For example, such intercooler is described in Patent Document 1.

The high-temperature heat exchange portion includes an inlet through which the first cooling water flows in, a high-temperature heat exchange part through which the first cooling water from the inlet flows, and an outlet through which the first cooling water having passed through the high-temperature heat exchange part flows out. Inner fins defining multiple cooling water passages for the first cooling water is provided in the high-temperature heat exchange part. The inner fins are configured to enhance heat exchange between the supercharged intake air flowing outside the high-temperature heat exchange part and the first cooling water flowing inside the high-temperature heat exchange part. A flow direction of the cooling water flowing through multiple cooling water passages intersects a flow direction of the supercharged intake air. Multiple cooling water passages are aligned in the flow direction of the supercharged intake air.

PRIOR ART DOCUMENT

Patent Document

Patent Document 1: JP 2015-155692 A

SUMMARY OF THE INVENTION

In the intercooler described in Patent Document 1, multiple cooling water flow passages are defined by inner fins. Therefore, since the width of each of the cooling water flow passages is narrow, the pressure loss of the cooling water generated when the cooling water flows through the high-temperature heat exchange part is large. Therefore, on the outlet side of the high-temperature heat exchange part, the water pressure decreases, and the boiling point of the cooling water decreases.

Further, the first cooling water in the cooling water passage (hereinafter, referred to as an upstream cooling water passage) located on the upstream side of the cooling water passages in the flow direction of the supercharged intake air exchanges heat with the supercharged intake air whose temperature is higher than the supercharged intake air exchanging heat with the first cooling water in the cooling water passage located on the downstream side in the flow direction of the supercharged intake air. Therefore, the temperature of the first cooling water flowing through the upstream cooling water passage is likely to increase.

As a result, the cooling water may boil on the outlet side of the upstream cooling water passage in the high-temperature heat exchange part. If the cooling water boils in the high-temperature heat exchange part, the temperature of the parts constituting the high-temperature heat exchange part of the intercooler may be raised, and the strength of the parts may decrease.

It is an object of the present disclosure to suppress a boiling of heat medium in an intercooler which is configured to cool a supercharged intake air with two kinds of heat medium having different temperature.

According to one aspect of the present disclosure, an intercooler that cools supercharged intake air supercharged to an engine includes a heat exchanger that has a first heat exchange portion through which a first heat exchange medium flows and a second heat exchange portion through which a second heat exchange medium whose temperature is lower than the first heat exchange medium flows.

The first heat exchange medium flowing through the first heat exchange portion cools the supercharged intake air by exchanging heat with the supercharged intake air. The second heat exchange medium flowing through the second heat exchange portion cools the supercharged intake air by exchanging heat with the supercharged intake air. The heat exchanger includes an inner fin configured to enhance the heat exchange between the supercharged intake air and the first heat exchange medium. The heat exchanger includes a boiling suppression portion configured to suppress boiling of the first heat exchange medium flowing in an upstream part, in a flow direction of the supercharged intake air, of the first heat exchange portion.

According to this, boiling of the heat medium can be suppressed in the intercooler that cools the supercharged intake air by using two heat medium different in temperature.

According to another aspect of the present disclosure, an intercooler that cools supercharged intake air supercharged to an engine includes an inlet through which a first heat exchange medium flows into the heat exchanger, a first heat exchange portion through which the first heat exchange medium from the inlet flows, an outlet through which the first heat exchange medium flows out of the heat exchanger, and a second heat exchange portion through which a second heat exchange medium flows, a temperature of the second heat exchange medium being lower than a temperature of the first heat exchange medium.

The first heat exchange medium flowing through the first heat exchange portion cools the supercharged intake air by exchanging heat with the supercharged intake air. The second heat exchange medium flowing through the second heat exchange portion cools the supercharged intake air by exchanging heat with the supercharged intake air. The heat exchanger includes an inner fin configured to enhance the heat exchange between the supercharged intake air and the first heat exchange medium. The first heat exchange portion includes a turn portion configured to cause heat exchange medium from the inlet to make a turn and guide the heat exchange medium toward the outlet. An inlet side part of the first heat exchange portion with respect to the turn portion is located upstream, in a flow direction of the supercharged intake air, of an outlet side part of the first heat exchange portion.

According to this, the temperature of the supercharged intake air exchanging heat with the first heat exchange medium flowing through the outlet side part of the first heat exchange portion is lower than the temperature of the supercharged intake air exchanging heat with the first heat medium flowing through the inlet side part of the first heat exchange portion. Accordingly, the boiling of the first heat exchange medium flowing through the outlet side part of the first heat exchange portion can be suppressed.

Further, even when the inlet side part of the first heat exchange portion is located upstream of the outlet side part of the first heat exchange portion with respect to the flow direction of the supercharged intake air, the pressure of the first heat exchange medium flowing through the inlet side part of the first heat exchange portion is higher than the pressure of the first heat exchange medium flowing through the outlet side part of the first heat exchange portion. Accordingly, the boiling of the first heat exchange medium flowing through the inlet side part of the first heat exchange portion can be suppressed.

Consequently, boiling of the heat medium can be suppressed in the intercooler that cools the supercharged intake air by using two heat medium different in temperature.

EMBODIMENTS FOR EXPLOITATION OF THE INVENTION

Figure 1:
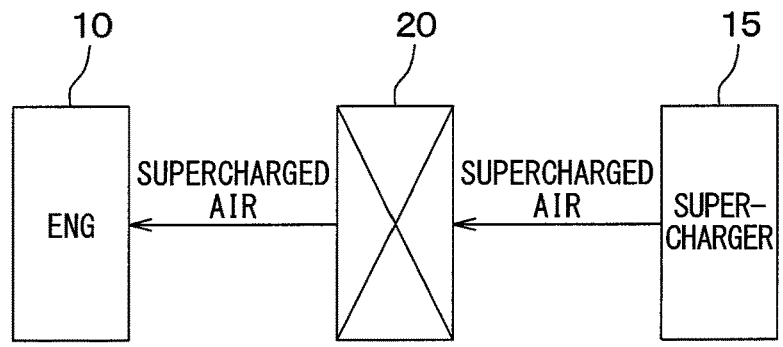
FIG. 1 is a diagram illustrating an overview of a supercharged intake air cooling system for a vehicle according to a first embodiment.

Hereinafter, embodiments of the present disclosure will be described with reference to the drawings. In the following embodiments, the same or equivalent parts are denoted by the same reference numerals as each other, and explanations will be provided to the same reference numerals for simplifying descriptions.

First Embodiment

A first embodiment of the present disclosure will be described with reference to the drawings. In the present embodiment, an example in which an intercooler 20 of the present disclosure is applied to a supercharged intake air cooling system 1 for a vehicle will be described.

A supercharger 15 for supercharging intake air to an engine 10 is provided in an intake air system of the engine 10 of the vehicle (that is, an internal combustion engine), as shown in FIG. 1. This supercharger 15 is provided to compensate for the maximum output of the engine 10. That is, the vehicle of the present embodiment has the engine 10 made smaller for higher fuel efficiency and the supercharger 15 is used to compensate for the maximum output reduced in exchange for making the engine 10 smaller.

An intercooler 20 cooling intake air of the engine 10 is located downstream of the supercharger 15 in the intake air system with respect to a flow of the intake air. The intercooler 20 cools the supercharged intake air that has been compressed by the supercharger 15 and supplies the supercharged intake air to the engine 10 so as to improve a charging efficiency of the intake air to the engine 10.

Figure 2:
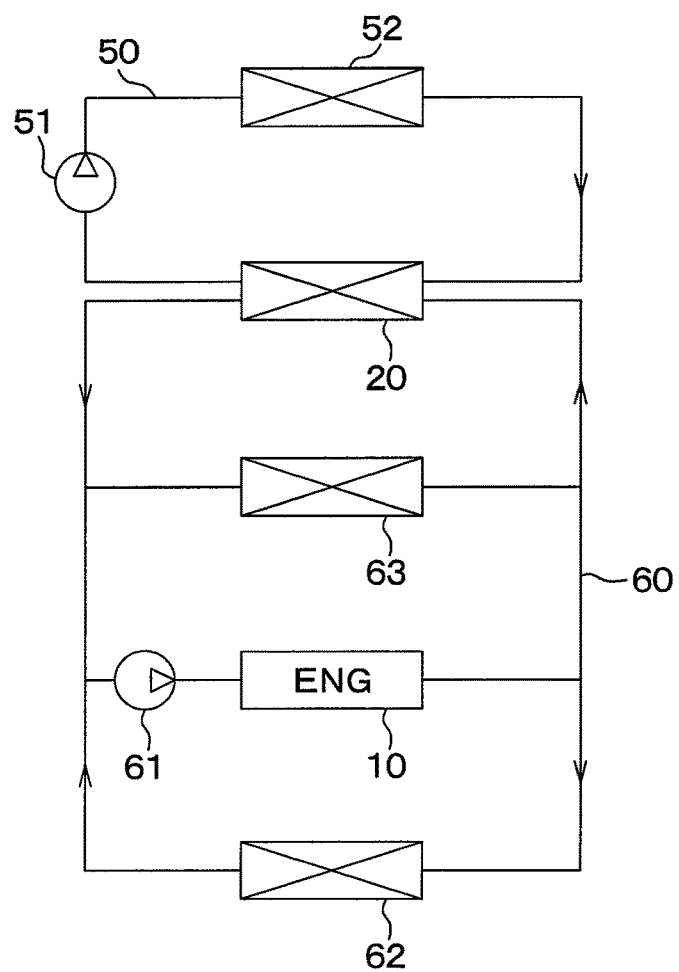
FIG. 2 is a diagram illustrating an overview of the supercharged intake air cooling system according to the first embodiment.

First cooling water circulating in a cooling water circuit 60 and second cooling water circulating in a cooling water circuit 50 flow through the intercooler 20 shown in FIG. 2. The intercooler 20 cools the supercharged intake air by exchanging heat between first, second cooling water and the supercharged intake air compressed by the supercharger 15.

A water pump 51 that causes the second cooling water to circulate is provided in the cooling water circuit 50. A first radiator 52 that cools the second cooling water by radiating heat of the second cooling water to outside air is provided between the water pump 51 and the intercooler 20 in the cooling water circuit 50.

A water pump 61, a second radiator 62, and a heater core 63 are provided in the cooling water circuit 60. The water pump 61 circulates the first cooling water in the cooling water circuit 60. The second radiator 62 releases heat, to outside air, of the first cooling water absorbed from the engine 10.

The heater core 63 heats blown air by exchanging the first cooling water and the blown air blown toward a vehicle compartment. The intercooler 20, the second radiator 62 and the heater core 63 are arranged in the cooling water circuit 60 in parallel with each other.

The first cooling water absorbs heat from the engine 10. Therefore, when the first, second cooling water pass through an inside of the intercooler 20, the first cooling water is higher in temperature than the second cooling water.

That is, the first cooling water is a first heat exchange medium (i.e. high-temperature cooling water) and the second cooling water is a second heat exchange medium (i.e.

low-temperature cooling water). LLC (antifreeze mixture), water or the like may be used as the first, second cooling water.

The water pumps 51, 61 of the present embodiment are driven by driving force output from the engine 10.

Next, the structure of the intercooler 20 of the present embodiment will be described in detail with reference to FIGS. 2 to 10.

Figure 3:
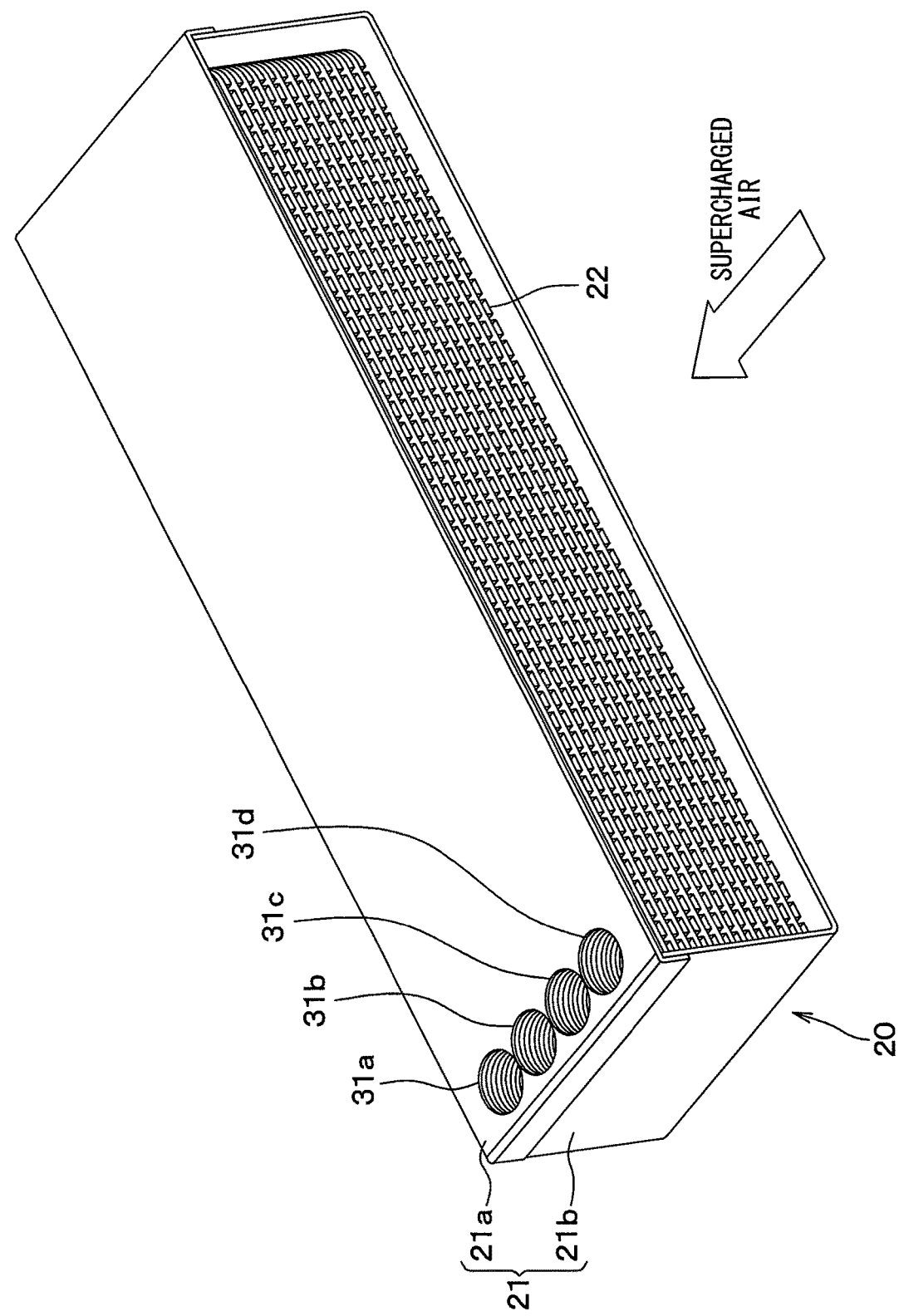
FIG. 3 is a perspective view illustrating an intercooler according to the first embodiment.
Figure 4:
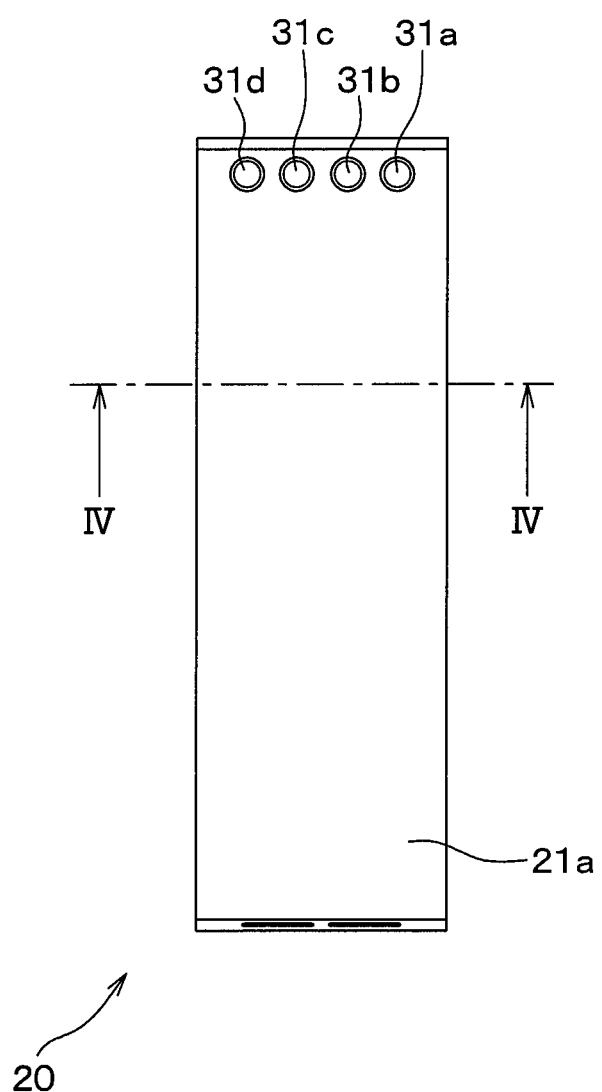
FIG. 4 is a top view illustrating the intercooler according to the first embodiment.

As shown in FIGS. 2, 3 and 4, the intercooler 20 of the present embodiment includes a support portion 21 and a heat exchanger 22.

The support portion 21 sandwiches the heat exchanger 22 by an upper support portion 21a and a lower support portion 21b joined with each other. An air inlet that guides the supercharged intake air from the supercharger 15 to the heat exchanger 22 and an air outlet that guides the supercharged intake air having passed through the heat exchanger 22 to the engine are provided between the upper support portion 21a and the lower support portion 21b.

Figure 5:
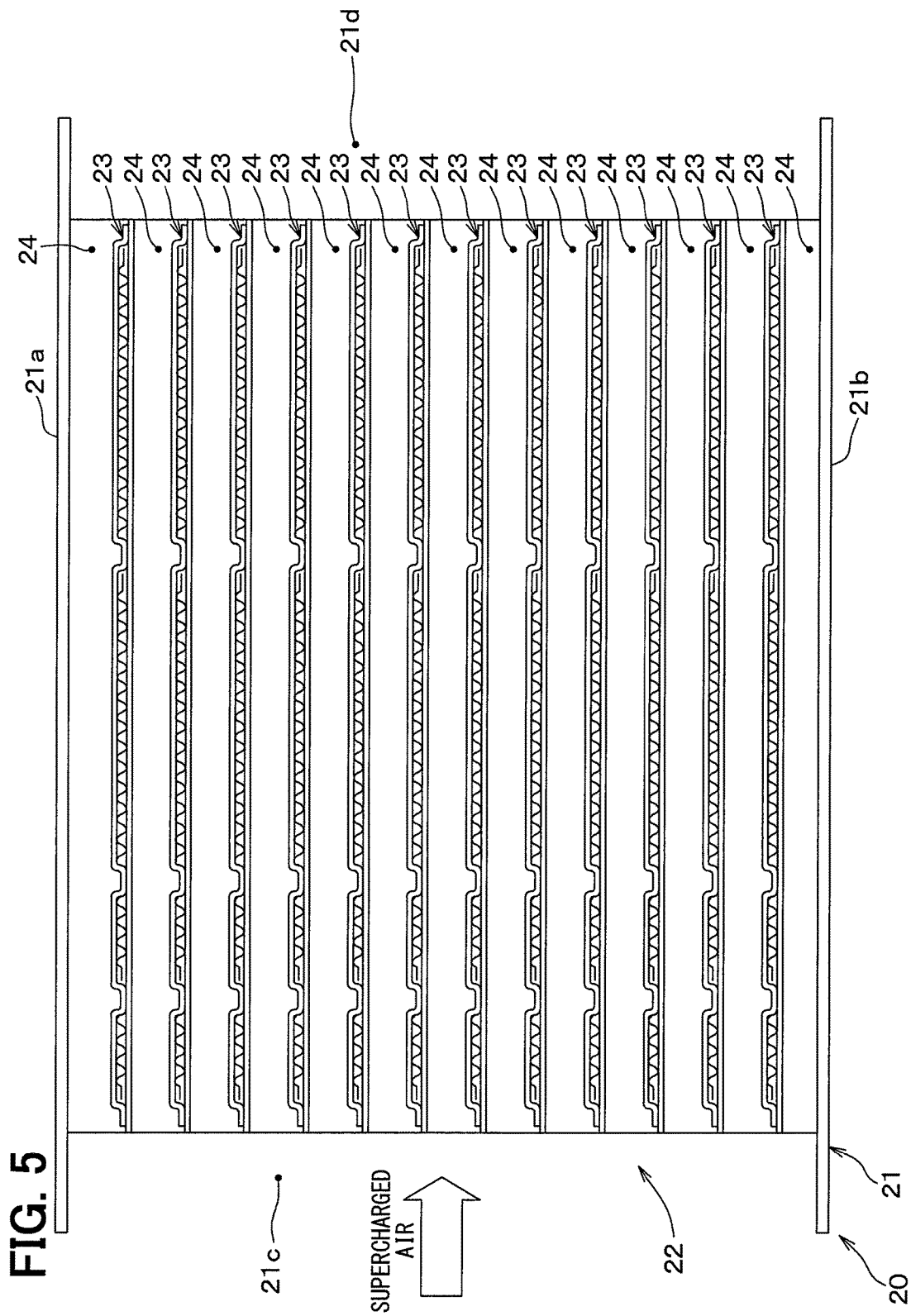
FIG. 5 is a cross-sectional view taken along V-V line in FIG. 4.

The heat exchanger 22 is configured as a so-called drawn cup type heat exchanger. As shown in FIGS. 4, 5, multiple flow path tubes 23 and outer fins 24 bonded to adjacent flow path tubes 23 are alternately stacked with each other.

The heat exchanger 22 is configured to exchange heat between the first, second cooling water flowing inside multiple flow path tubes 23 and the supercharged intake air flowing outside the flow path tubes 23.

The space in which the outer fins 24 are arranged between two adjacent flow path tubes 23 constitutes a supercharged intake air flow path through which the supercharged intake air flows. The outer fins 24 promote heat exchange between the first, second cooling water and the supercharged intake air.

Figure 6:
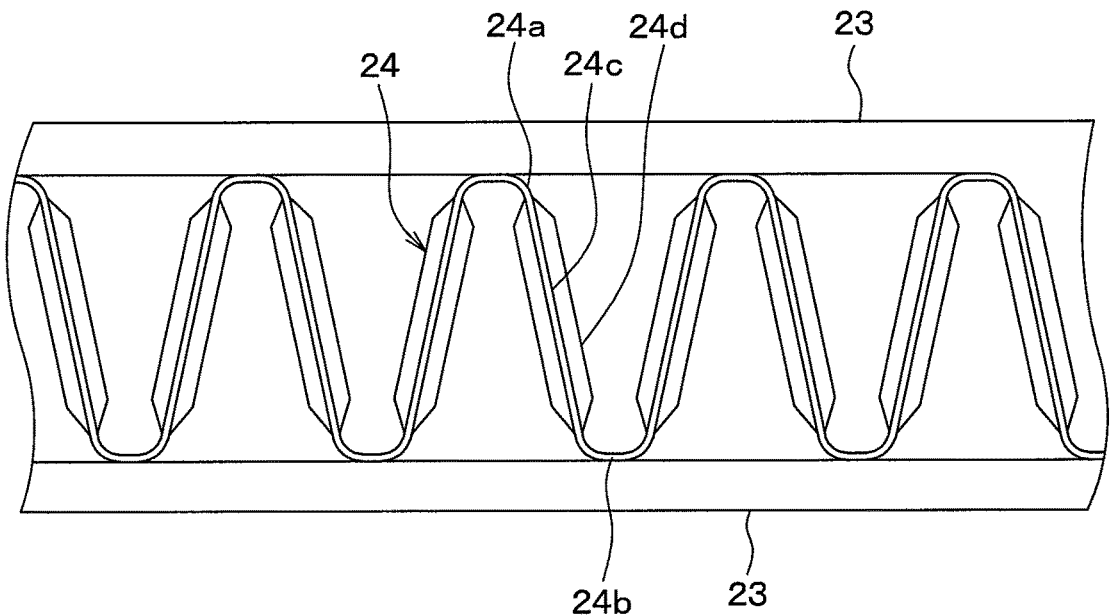
FIG. 6 is a front view illustrating flow path tubes and outer fins according to the first embodiment.

As shown in FIGS. 5, 6, the outer fins 24 of the present embodiment are corrugated fins formed by bending a plate member into a corrugated shape.

The outer fin 24 has a wavy shape in which peak portions 24a and valley portions 24b are arranged alternately and repeatedly. The outer fins 24 are configured as louver fins each having a louver 24d formed on a middle portion 24c between the peak portion 24a and the valley portion 24b.

The peak portions 24a and the valley portions 24b are brazed to the flow path tubes 23. In FIG. 5, the louver 24d is not shown.

Figure 7:
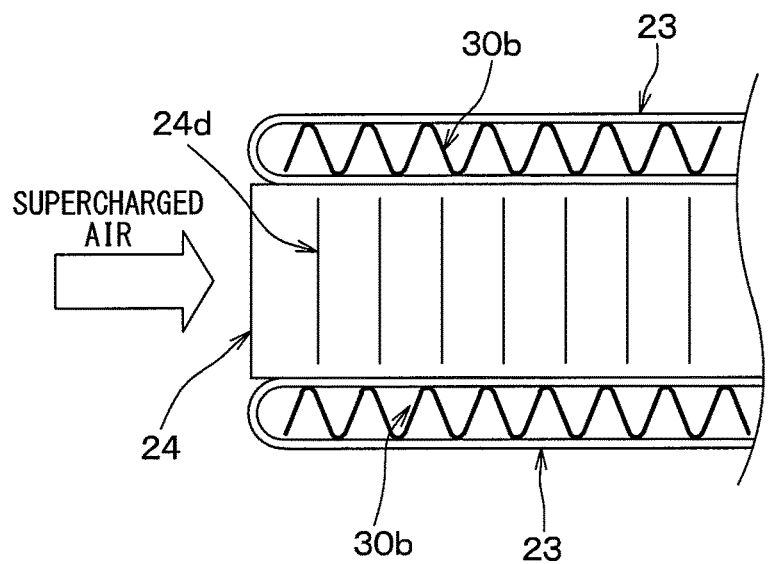
FIG. 7 is a cross-sectional view illustrating flow path tubes and outer fins according to the first embodiment.
Figure 8:
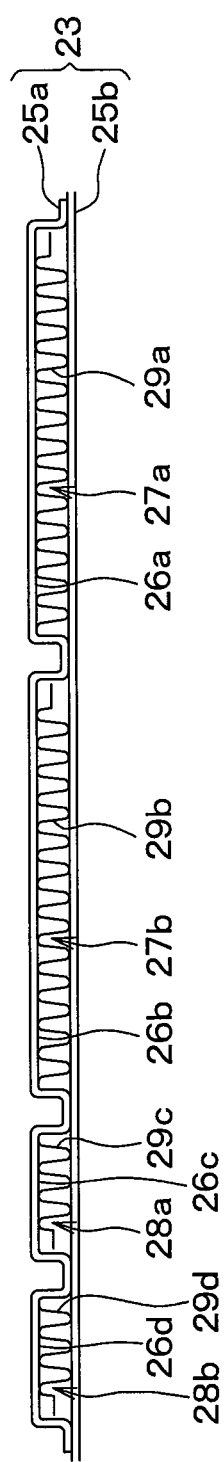
FIG. 8 is an enlarged view showing the flow path tube in FIG. 5 enlarged in the longitudinal direction.

As shown in FIGS. 7 and 8, each of the flow path tubes 23 is a flattened heat exchanging portion formed by joining a pair of plates 25a and 25b. The plate 25a corresponds to a first plate and the plate 25b corresponds to a second plate.

Specifically, recess portions 26a, 26b, 26c, and 26d are formed in the plate 25a as shown in FIG. 8. The recess portions 26a, 26b, 26c, 26d of the plate 25a are closed by the plate 25b.

A cooling water flow path 27a through which the second cooling water flows is defined between the recess portion 26a and the plate 25b. A cooling water flow path 27b through which the second cooling water flows is defined between the recess portion 26b and the plate 25b.

The cooling water flow paths 27a and 27b together with a U-turn portion 27c constitute a heat exchange portion 27 as a second heat exchange portion. See also FIG. 9.

The cooling water flow path 27a leads the second cooling water from an inlet 27d to the U-turn portion 27c. The U-turn portion 27c is a cooling water flow path bent in a U-shape and causes the second cooling water from the cooling water flow path 27a to make a U-turn.

The cooling water flow path 27b leads the second cooling water from the U-turn portion 27c to an outlet 27e. The inlet 27d and the outlet 27e are formed by forming through-holes in the plates 25a, 25b, respectively. The cooling water flow paths 27a, 27b are partitioned by a partitioning portion 27f.

Inner fins 29a are provided inside the cooling water flow path 27a. The inner fin 29a is a corrugated fin that partitions the cooling water flow path 27a into multiple first low-temperature cooling water flow paths.

The inner fins 29b are provided inside the cooling water flow path 27b. Multiple first low-temperature cooling water flow paths are aligned in the flow direction of the supercharged intake air.

The inner fin 29b is a corrugated fin that partitions the cooling water flow path 27b into multiple second low-temperature cooling water flow paths. Multiple second low-temperature cooling water flow paths are aligned in the flow direction of the supercharged intake air.

A cooling water flow path 28a through which the first cooling water flows is defined between the recess portion 26c and the plate 25b. A cooling water flow path 28b through which the first cooling water flows is defined between the recess portion 26d and the plate 25b.

The cooling water flow paths 28a and 28b together with a U-turn portion 28c constitute a heat exchange portion 28 as a first heat exchange portion. See also FIG. 9.

The cooling water flow path 28a leads the first cooling water from an inlet 28d to the U-turn portion 28c. The U-turn portion 28c is a cooling water flow path bent in a U-shape and causes the first cooling water from the cooling water flow path 28a to make a U-turn.

The cooling water flow path 28b leads the first cooling water from the U-turn portion 28c to an outlet 28e. The first cooling water having passed through the heat exchange portion 28 is discharged from the outlet 28e. The inlet 28d and the outlet 28e are formed by forming through-holes in the plates 25a, 25b, respectively. The cooling water flow paths 28a, 28b are partitioned by a partitioning portion 28f.

Inner fins 30a are provided inside the cooling water flow path 28a. The inner fin 30a is a corrugated fin that partitions the cooling water flow path 28a into multiple first high-temperature cooling water flow paths. Multiple first high-temperature cooling water flow paths are aligned in the flow direction of the supercharged intake air.

The inner fins 30b are provided inside the cooling water flow path 28b. The inner fin 30b is a corrugated fin that partitions the cooling water flow path 28b into multiple second high-temperature cooling water flow paths. Multiple second high-temperature cooling water flow paths are aligned in the flow direction of the supercharged intake air.

A cooling water flowing direction A is a flow direction of the second cooling water flowing inside the first low-temperature cooling water flow paths, and a cooling water flowing direction B is a flow direction of the second cooling water flowing inside the second low-temperature cooling water flow paths.

A cooling water flowing direction C is a flow direction of the first cooling water flowing inside the first high-temperature cooling water flow paths, and a cooling water flowing direction D is a flow direction of the first cooling water flowing inside the second high-temperature cooling water flow paths.

The cooling water flow direction A, the cooling water flow direction B, the cooling water flow direction C, and the cooling water flow direction D of this embodiment are parallel with each other. The cooling water flow direction A, the cooling water flow direction B, the cooling water flow direction C, and the cooling water flow direction D intersect a flow direction of the supercharged intake air, e.g. perpendicular to the flow direction of the supercharged intake air.

The cooling water flow path 28b is located upstream of the cooling water flow path 28a with respect to the flow direction of the supercharged intake air. The cooling water flow path 28a is located upstream of the cooling water flow path 27b with respect to the flow direction of the supercharged intake air.

The cooling water flow path 27b is located upstream of the cooling water flow path 27a with respect to the flow direction of the supercharged intake air. That is, the cooling water flow path 28b is located most upstream in the cooling water flow paths 28a, 28b, 27a, 27b with respect to the flow direction of the supercharged intake air.

The flow path lengths of the cooling water flow paths 27a, 27b are the same. The lengths of the cooling water flow paths 27a and 27b in the flow direction of the supercharged intake air (that is, the lengths in the width direction of the cooling water flow paths 27a, 27b) are the same.

The flow path lengths of the cooling water flow paths 28a, 28b are the same. The lengths of the cooling water flow paths 28a and 28b in the flow direction of the supercharged intake air (that is, the lengths in the width direction of the cooling water flow paths 28a, 28b) are the same. The lengths of the cooling water flow paths 28a, 28b in the flow direction of the supercharged intake air are shorter than that of the cooling water flow paths 27a, 27b.

The first distribution tank portion is configured by connecting the inlets 27d of the two adjacent flow path tubes 23 among multiple flow path tubes 23. The first distribution tank portion distributes the second cooling water to the heat exchange portion 27 of multiple flow path tubes 23. The first distribution tank portion is connected to a cooling water pipe (not shown) extending through a through-hole 31a of the upper support portion 21a.

A first collecting tank portion is configured by connecting the outlets 27e of the two adjacent flow path tubes 23 among multiple flow path tubes 23. The first collecting tank portion gathers the second cooling water from the heat exchange portions 27 of multiple flow path tubes 23. The first collecting tank portion is connected to a cooling water pipe (not shown) extending through the through-hole 31b of the upper support portion 21a.

The cooling water pipes extending through the through-holes 31a, 31b of the upper support portion 21a constitute the cooling water circuit 50.

The second distribution tank portion is configured by connecting the inlets 28d of the two adjacent flow path tubes 23 among multiple flow path tubes 23. The second distribution tank portion distributes the first cooling water to the heat exchange portions 28 of multiple flow path tubes 23. The second distribution tank portion is connected to a cooling water pipe (not shown) extending through a through-hole 31c of the upper support portion 21a.

A second collecting tank portion is configured by connecting the outlets 28e of the two adjacent flow path tubes 23 among multiple flow path tubes 23. The second collecting tank portion gathers the second cooling water from the heat exchange portions 28 of multiple flow path tubes 23. The second collecting tank portion is connected to a cooling water pipe (not shown) extending through the through-hole 31d of the upper support portion 21a.

The cooling water pipes extending through the through-holes 31c, 31d of the upper support portion 21a constitute the cooling water circuit 60.

Figure 11:
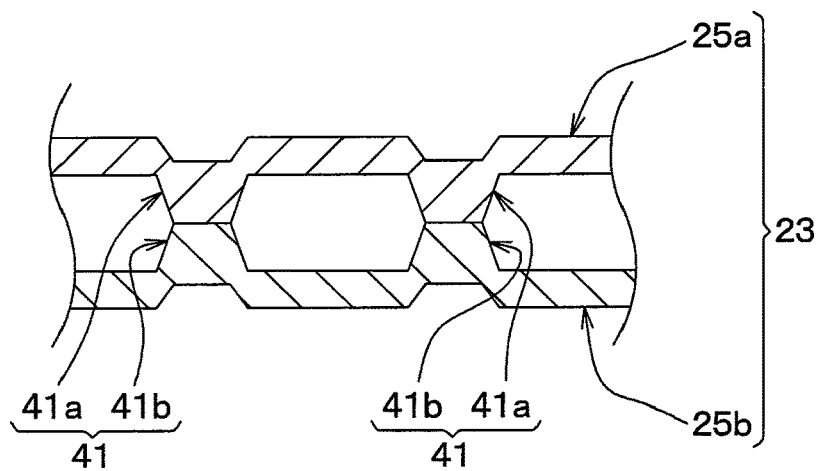
FIG. 11 is a cross-sectional view taken along line XI-XI of FIG. 10.

Next, a structure for suppressing the boiling of the first cooling water, which is a feature of the present embodiment, will be described with reference to FIGS. 11 to 8.

Figure 9:
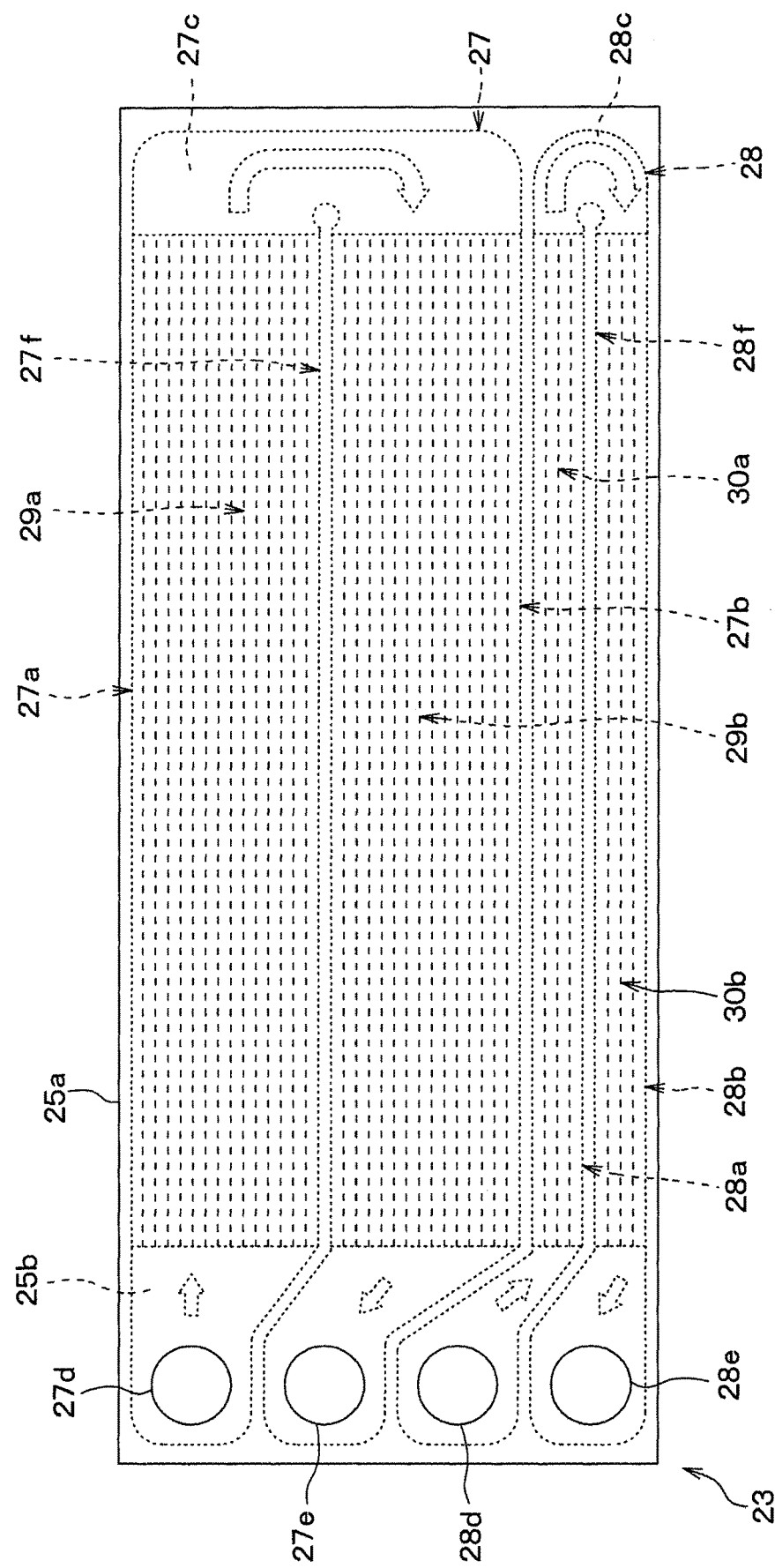
FIG. 9 is a perspective view of a plate of the flow path tube showing an internal structure of the flow path tube of the first embodiment.
Figure 10:
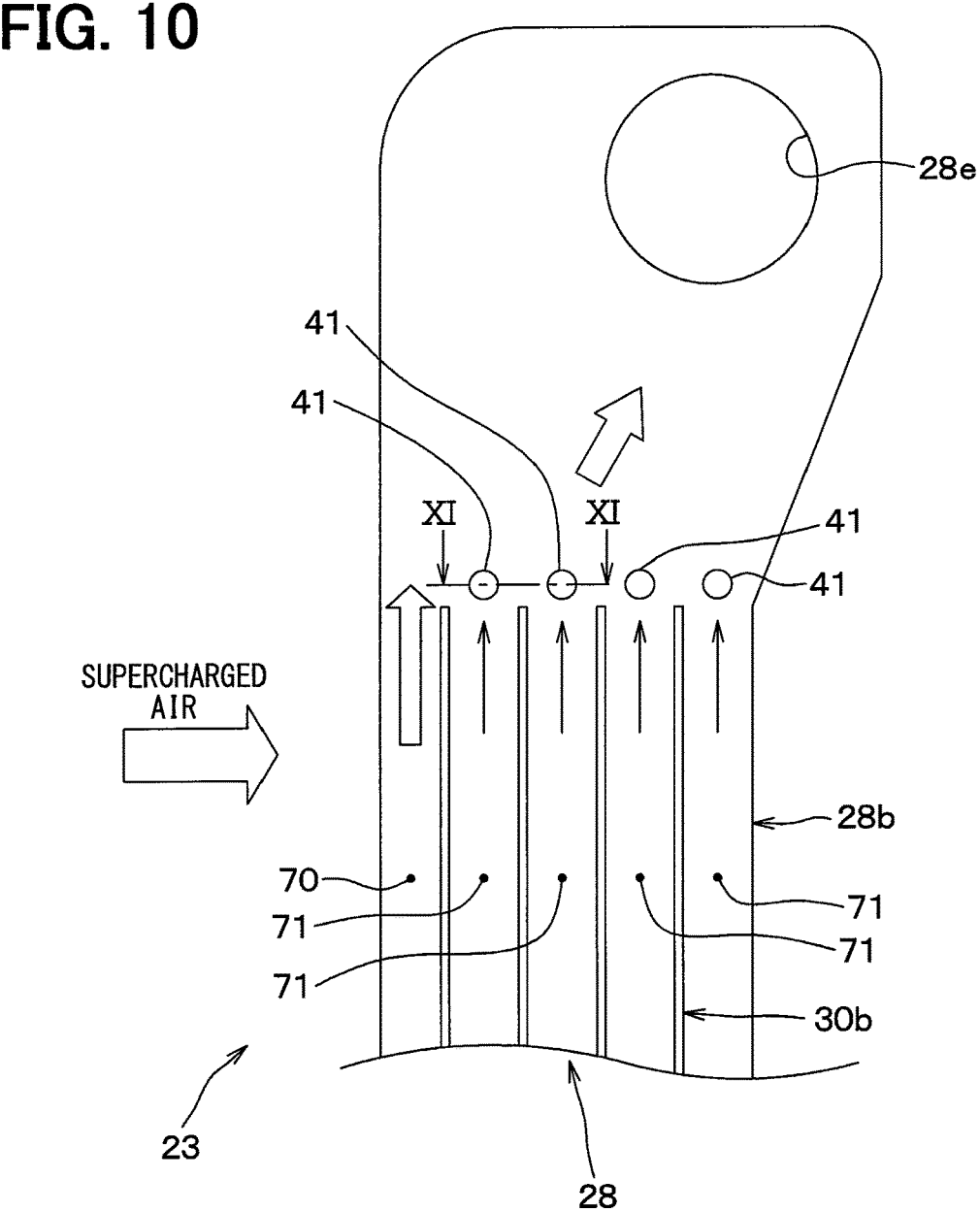
FIG. 10 is a partially enlarged view showing an outlet side of the heat exchange portion inside the flow exchange portion of FIG. 9.

FIG. 8 is an enlarged view of the flow path tube 23 in FIG. 5 enlarged in a longitudinal direction in order to clarify the illustration of the internal structure of the flow path tube 23 in FIG. 5. That is, for convenience of explanation, the longitudinal dimension of the flow path tube 23 in FIG. 8 is made larger than the longitudinal dimension of the flow path tube 23 in FIG. 5. FIG. 9 is a perspective view of the plate 25a of the flow path tube 23 showing the internal structure of the flow path tube 23. FIG. 10 is a partially enlarged view showing the vicinity of the outlet 28e of the heat exchange portion 28 in the internal structure of the flow path tube 23 with the plate 25a of the flow path tube 23 removed.

The inner fin 30b shown in FIG. 10 is a corrugated fin that partitions the cooling water flow path 28b into multiple second high-temperature cooling water flow paths (i.e. multiple heat exchange medium flow paths), as described above.

A second high-temperature cooling water flow path 70 is the second high-temperature cooling water flow path located most upstream in multiple second high-temperature cooling water flow paths with respect to the flow direction of the supercharged intake air. See also FIG. 9. A second high-temperature cooling water flow path 71 of multiple second high-temperature cooling water flow paths is the second high-temperature cooling water flow path located downstream of the second high-temperature flow path 70. The second high-temperature cooling water flow path 70 corresponds to a first flow path, and the second high-temperature cooling water flow path 71 corresponds to a second flow path.

In each of the heat exchange portions 28 of the flow path tubes 23 of the present embodiment, multiple ribs 41 are provided as boiling suppression members. As shown in FIG. 10, each of the ribs 41 is a resistor disposed between the second high-temperature cooling water flow paths 71 and the outlet 28e.

That is, each of the ribs 41 is located downstream of the second high-temperature cooling water flow paths 71 in the flow direction of the first cooling water. More specifically, each of the ribs 41 is located on a second high-temperature cooling water flow path 71 side between the second high-temperature cooling water flow path 71 and the outlet 28e. Therefore, the ribs 41 are disposed offset from the inner fins 30b in the heat exchange portion 28 in the downstream direction of a flow of the first cooling water in the cooling water flow path 28b. In contrast, the rib 41 is not disposed on the outlet side of the second high temperature cooling water flow path 70.

Each of the ribs 41 is a resistor that generates resistance to the flow of the first cooling water flowing through the second high-temperature cooling water flow paths 71.

That is, each of the ribs 41 causes pressure losses of the first cooling water flowing through second high-temperature cooling water flow paths 71.

Each of the ribs 41 of the present embodiment is configured by joining the distal end of the protrusion portion 41a of the plate 25a to the distal end of the protrusion portion 41b of the plate 25b. The protrusion portion 41a is formed to be convex toward the plate 25b. The protrusion portion 41b is formed to be convex toward the plate 25a.

All or some of the constituent parts of the intercooler 20 are formed of a clad material formed by cladding a brazing material on the surface of a core material made of, for example, aluminum. The respective components of the intercooler 20 are brazed and bonded with each other by heating it in a condition where the flux is applied to the surface of the clad material.

Next, the operation of the supercharged intake air cooling system 1 of the present embodiment will be described.

First, the water pumps 51, 61 of the present embodiment are driven by driving force output from the engine 10.

At this time, in the cooling water circuit 60, the water pump 61 sucks the first cooling water from the intercooler 20 and the first cooling water from the second radiator 62, and the water pump 61 leads the first cooling water to the cooling water inlet of the engine 10.

The first cooling water that has passed through the engine 10 is distributed to the intercooler 20, the heater core 63, and the second radiator 62.

At this time, the first cooling water that has passed through the engine 10 is distributed to each of the flow path tubes 23 by the second distribution tank portion. The first cooling water distributed to each of the flow path tubes 23 is distributed to each of the first high-temperature cooling water flow paths.

The first cooling water that has passed through each of the first high-temperature cooling water flow paths is collected in the U-turn portion 28c, and the collected first cooling water makes a U-turn and is distributed to the second high-temperature cooling water flow paths.

The first cooling water that has passed through the second high-temperature cooling water flow paths gathers in the first collecting tank portion and flows to the outlet of the water pump 61.

Therefore, the heat is exchanged between the first cooling water and the supercharged intake air flowing outside the flow path tube 23 when the first cooling water flows through multiple first high-temperature cooling water flow paths, the U-turn portion 28c, and the second high-temperature cooling water flow paths, and thereby the supercharged intake air is cooled by the first cooling water.

In this way, the supercharged intake air cooled by the first cooling water passes outside the heat exchange portion 28.

In the cooling water circuit 50, the second cooling water from the water pump 51 flows through, in order, the first radiator 52, the intercooler 20, and the water pump 51.

At this time, the second cooling water that has passed through the first radiator 52 flows to the flow path tubes 23 by the first distribution tank portion. The second cooling water distributed to each of the flow path tubes 23 is distributed to each of the first low-temperature cooling water flow paths.

The second cooling water that has passed through each of the first low-temperature cooling water flow paths is collected in the U-turn portion 27c, and the collected second cooling water makes a U-turn and is distributed to the second low-temperature cooling water flow paths.

Subsequently, the second cooling water that has passed through the second low-temperature cooling water flow paths gathers in the first collecting tank portion and flows to the outlet of the water pump 51.

Therefore, the heat is exchanged between the second cooling water and the supercharged intake air flowing outside the flow path tube 23 when the second cooling water flows through multiple first low-temperature cooling water flow paths, the U-turn portion 27c, and the second low-temperature cooling water flow paths, and thereby the supercharged intake air is cooled by the second cooling water.

In this way, the supercharged intake air cooled by the second cooling water and the first cooling water are sucked into the engine 10.

Each of the ribs 41 is located downstream of the second high-temperature cooling water flow paths 71 in the flow direction of the first cooling water. In contrast, the rib 41 is not disposed on the downstream side of the second high temperature cooling water flow path 70 in the flow direction of the first cooling water.

Accordingly, the ribs 41 cause pressure losses of the first cooling water flowing through the second high-temperature cooling water flow paths 71. Therefore, the flow speed of the first cooling water flowing through the second high-temperature cooling water flow paths 71 can be decreased, and the flow speed of the first cooling water flowing through the second high-temperature cooling water flow path 70 can be increased.

Therefore, the flow speed of the first cooling water in the second high-temperature cooling water flow path 70 can be increased as compared with the conventional intercooler 20 not provided with the ribs 41.

According to the present embodiment described above, the intercooler 20 includes multiple flow path tubes 23 for cooling the supercharged intake air supercharged to the engine 10 by the supercharger 15. Each of the flow path tubes 23 forms the heat exchange portion 28 through which the first cooling water flows, and the first cooling water flowing through the heat exchange portion 28 cools the supercharged intake air.

Each of the flow path tubes 23 forms the heat exchange portion 27 through which the second cooling water whose temperature is lower than the first cooling water flows, and the second cooling water flowing through the heat exchange portion 27 cools the supercharged intake air.

The inner fins 30a, 30b for promoting heat exchange between the first cooling water and the supercharged intake air are disposed in the heat exchange portion 28. The inner fin 30a partitions the cooling water flow path 28a into multiple first high-temperature cooling water flow paths. The inner fin 30b partitions the cooling water flow path 28b into the second high-temperature cooling water flow path and multiple second high-temperature cooling water flow paths.

Here, since the inner fins 30a, 30b and the U-turn portion 28c are provided in the heat exchange portion 28, the pressure loss of the first cooling water is large. Therefore, since the water pressure drops largely at the outlet 28e side in the heat exchange portion 28, the boiling point decreases at the outlet 28e side in the heat exchange portion 28.

In particular, the heat exchange portion 28 is located upstream of the heat exchange portion 27 with respect to the supercharged air. Further, the cooling water flow path 28b is located upstream of the cooling water flow path 28a with respect to the supercharged intake air. The second high-temperature cooling water flow path 70 is located upstream of the second high-temperature cooling water flow paths 71 with respect to the supercharged intake air. Therefore, the temperature of the first cooling water flowing through the second high-temperature cooling water flow path 70 is likely to increase.

In the present embodiment, each of the ribs 41 is located between the second high-temperature cooling water flow paths 71 and the outlet 28e. Each of the ribs 41 generates resistance to the flow of the first cooling water flowing through the second high-temperature cooling water flow paths 71. Therefore, the flow speed of the first cooling water flowing through the second high-temperature cooling water flow paths 71 can be decreased, and the flow speed of the first cooling water flowing through the second high-temperature cooling water flow path 70 can be increased.

Therefore, the flow speed of the first cooling water can be increased as compared with the conventional intercooler 20 not provided with the ribs 41. Therefore, the temperature of the first cooling water flowing through the second high-temperature cooling water flow path 70 can be decreased as compared with the conventional intercooler 20 not provided with the ribs 41. This makes it possible to suppress the boiling of the first cooling water flowing through the second high-temperature cooling water flow path 70.

First Modification of First Embodiment

Figure 12:
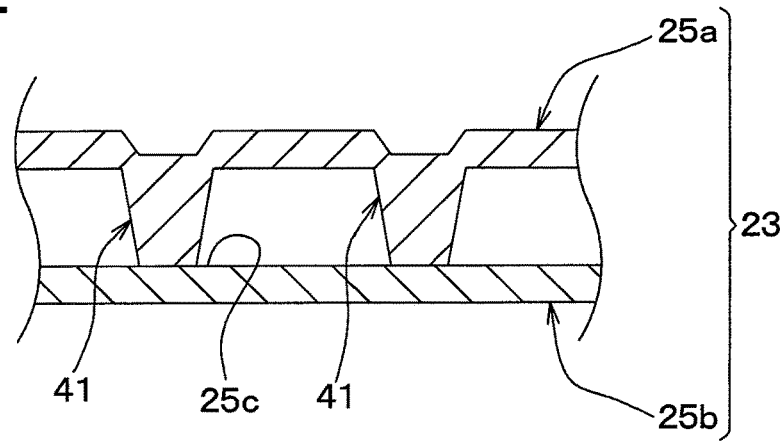
FIG. 12 is a cross-sectional view corresponding to FIG. 11 and showing ribs according to a first modification of the first embodiment.

In the first embodiment, the rib 41 is formed by combining the protrusion portion 41a of the plate 25a and the protrusion portion 41b of the plate 25b. However, instead of this, the rib 41 may be formed as shown in FIG. 12.

That is, in the first modification, no protrusion portion is provided on the plate 25b, and an upper portion 25c of the plate 25b facing the plate 25a is formed in a planar shape.

The protrusion portion of the plate 25a joined to the upper portion 25c of the plate 25b is the rib 41 that is the boiling suppression member. The protrusion portion of the plate 25a is convex to the plate 25b from the plate 25a side.

Second Modification of First Embodiment

Figure 13:
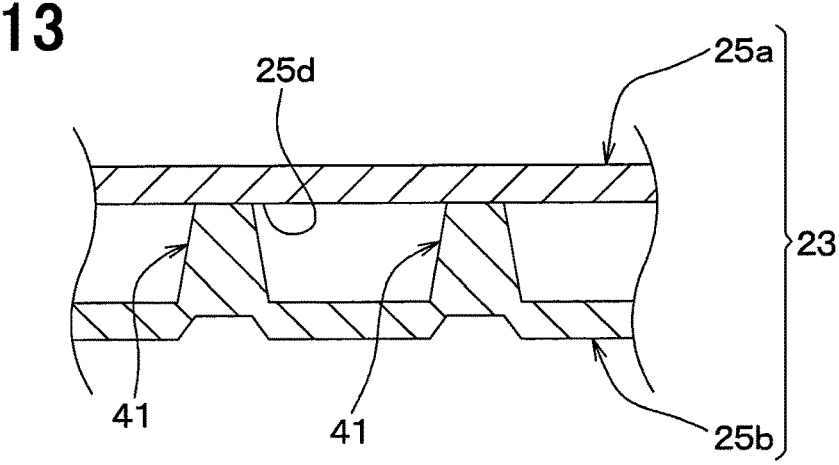
FIG. 13 is a cross-sectional view corresponding to FIG. 11 and showing ribs according to a second modification of the first embodiment.

In the first embodiment, the rib 41 is formed by combining the protrusion portion 41a of the plate 25a and the protrusion portion 41b of the plate 25b. However, instead of this, the rib 41 may be formed as shown in FIG. 13.

That is, in the second modification, no protrusion portion is provided on the plate 25a, and a lower portion 25d of the plate 25a facing the plate 25b is formed in a planar shape.

The protrusion portion of the plate 25b joined to the lower portion 25d of the plate 25a is the rib 41 that is the boiling suppression member. The protrusion portion of the plate 25b is convex to the plate 25a from the plate 25b side.

Second Embodiment

In the above-described first embodiment, the flow rate of the first cooling water flowing through the second high-temperature cooling water flow path on the upstream side in the flow direction of the supercharged intake air is increased by using the ribs 41. In the second embodiment, the flow rate of the first cooling water flowing through the second high-temperature cooling water flow path on the upstream side in the flow direction of the supercharged intake air is increased by settings of fin pitches of the inner fin 30b.

Figure 14:
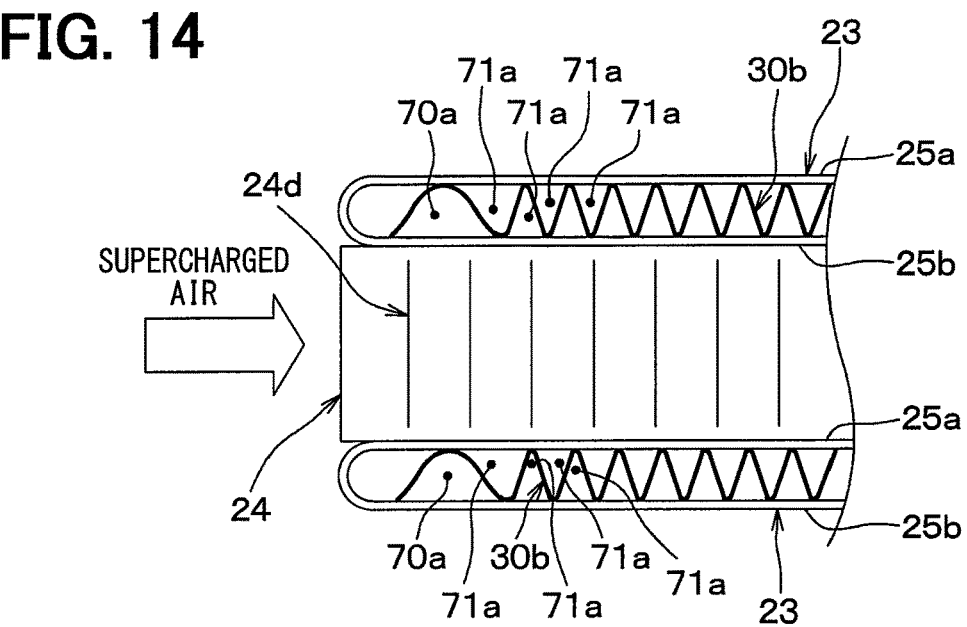
FIG. 14 is a cross-sectional view illustrating a part of flow path tubes according to the second embodiment.
Figure 15:
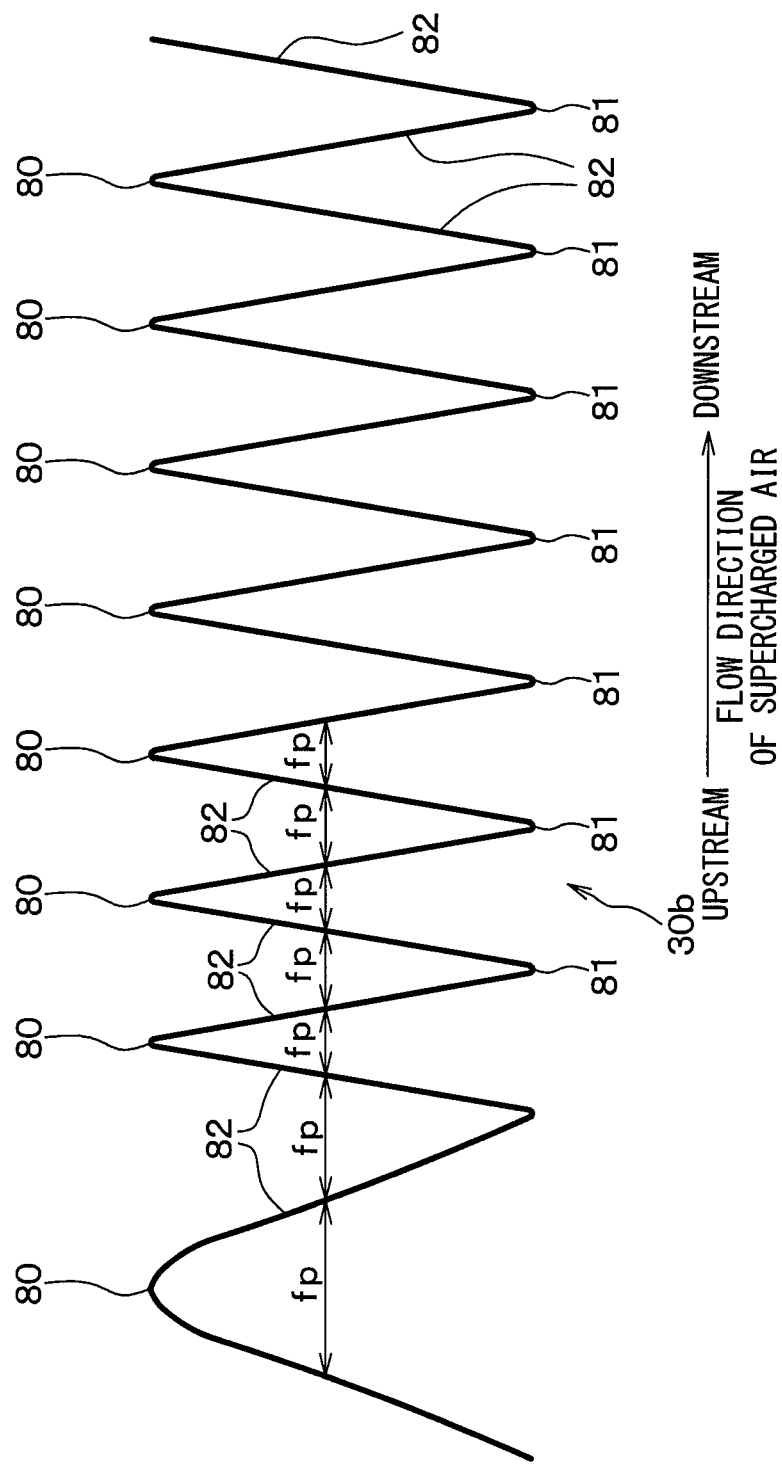
FIG. 15 is a cross-sectional view showing the inner fin in FIG. 14.

FIG. 14 is a schematic view showing the internal structure of the flow path tube 23 of the present embodiment. FIG. 15 shows a single inner fin 30b.

The inner fin 30b has multiple peak portions 80 and multiple valley portions 81 and has a corrugated shape, and the peak portions 80 and the valley portions 81 are arranged alternately one by one in the flow direction of the first cooling water.

A direction perpendicular to the flow direction of the first cooling water is the flow direction of the supercharged intake air. The peak portions 80 are joined to the plate 25a. The valley portions 81 are joined to the plate 25b.

A space between two adjacent middle portions 82 of the inner fin 30b constitutes the second high-temperature cooling water flow path. Therefore, the inner fin 30b defines, between the plates 25a, 25b, the second high-temperature cooling water flow paths aligned in the flow direction of the supercharged intake air. The middle portion 82 is a portion of the inner fin 30b between the peak portion 80 and the valley portion 81 adjacent to each other.

A second high-temperature cooling water flow path 70a is the second high-temperature cooling water flow path located most upstream in multiple second high-temperature cooling water flow paths with respect to the flow direction of the supercharged intake air. Multiple second high-temperature cooling water flow paths 71a of multiple second high-temperature cooling water flow paths are the second high-temperature cooling water flow paths located downstream of the second high-temperature cooling water flow paths 70a.

In the present embodiment, the fin pitch fp of the inner fin 30b is set so that the flow passage cross-sectional area of the second high-temperature cooling water flow path 70a is greater than the flow passage cross-sectional area of the second high-temperature cooling water flow path 71a.

The flow path cross-sectional area of the second high-temperature cooling water flow paths 71a, 70a is an area of a cross-section orthogonal to the flow direction of the first cooling water in the second high-temperature cooling water flow paths 71a, 70a.

In other words, the inner fin 30b that is the boiling suppression member is set such that the fin pitch fp on the downstream side in the flow direction of the supercharged intake air is larger than the fin pitch fp on the upstream side in the flow direction of the supercharged intake air.

The fin pitch fp is a distance between two adjacent middle portions 82 in the inner fin 30b.

Specifically, when the inner fin 30b in FIG. 15 is regarded as a wave, "the fin pitch fp on the downstream side in the flow direction of supercharged intake air" is set at a reference position where the amplitude is zero in the middle portion 82 of the inner fin 30b. Further, when the inner fin 30b in FIG. 15 is regarded as a wave, "the fin pitch fp on the upstream side in the flow direction of supercharged intake air" is set at a reference position where the amplitude is zero in the middle portion 82 of the inner fin 30b.

When a direction orthogonal to the flow direction of the supercharged intake air on the paper surface is considered as an amplitude direction, the reference position is the center position of the middle portion 82 in the amplitude direction. Here, in the inner fin 30b of FIG. 15, the peak portions 80 are set at positions having the same amplitude value. The valley portions 81 are set at positions having the same amplitude value.

Since the fin pitch fp in the inner fin 30b is set in this way, the flow passage cross-sectional area of the second high-temperature cooling water flow path 70a is greater than the flow passage cross-sectional area of the second high-temperature cooling water flow path 71a.

Accordingly, the flow rate of the first cooling water flowing through the second high-temperature cooling water flow paths 71a can be decreased, and the flow rate of the first cooling water flowing through the second high-temperature cooling water flow path 70a can be increased.

Therefore, the flow rate of the first cooling water flowing through the second high-temperature cooling water flow path 70a can be increased in comparison to a case where "the fin pitch fp on the downstream side in the flow direction of the supercharged intake air" and "the fin pitch fp on the upstream side in the flow direction of the supercharged intake air" are the same.

Accordingly, the heat capacity of the second high-temperature cooling water flow path 70a can be increased in comparison to a case where the flow path cross-sectional area of the second high-temperature cooling water flow path 70a and the flow path cross-sectional area of the second high-temperature cooling water flow path 71a are the same. Therefore, it is possible to lower the temperature of the first cooling water in the second high-temperature cooling water flow path 70a. This makes it possible to suppress the boiling of the first cooling water flowing through the second high-temperature cooling water flow path 70a.

According to the above-described present embodiment, it is possible to suppress the boiling of the first cooling water in the intercooler 20.

Third Embodiment

In the first embodiment, the inlet 28d is located downstream of the outlet 28e with respect to the supercharged intake air. In the third embodiment, an example where the inlet 28d is located upstream of the outlet 28e with respect to the supercharged intake air will be described with reference to FIG. 16.

Figure 16:
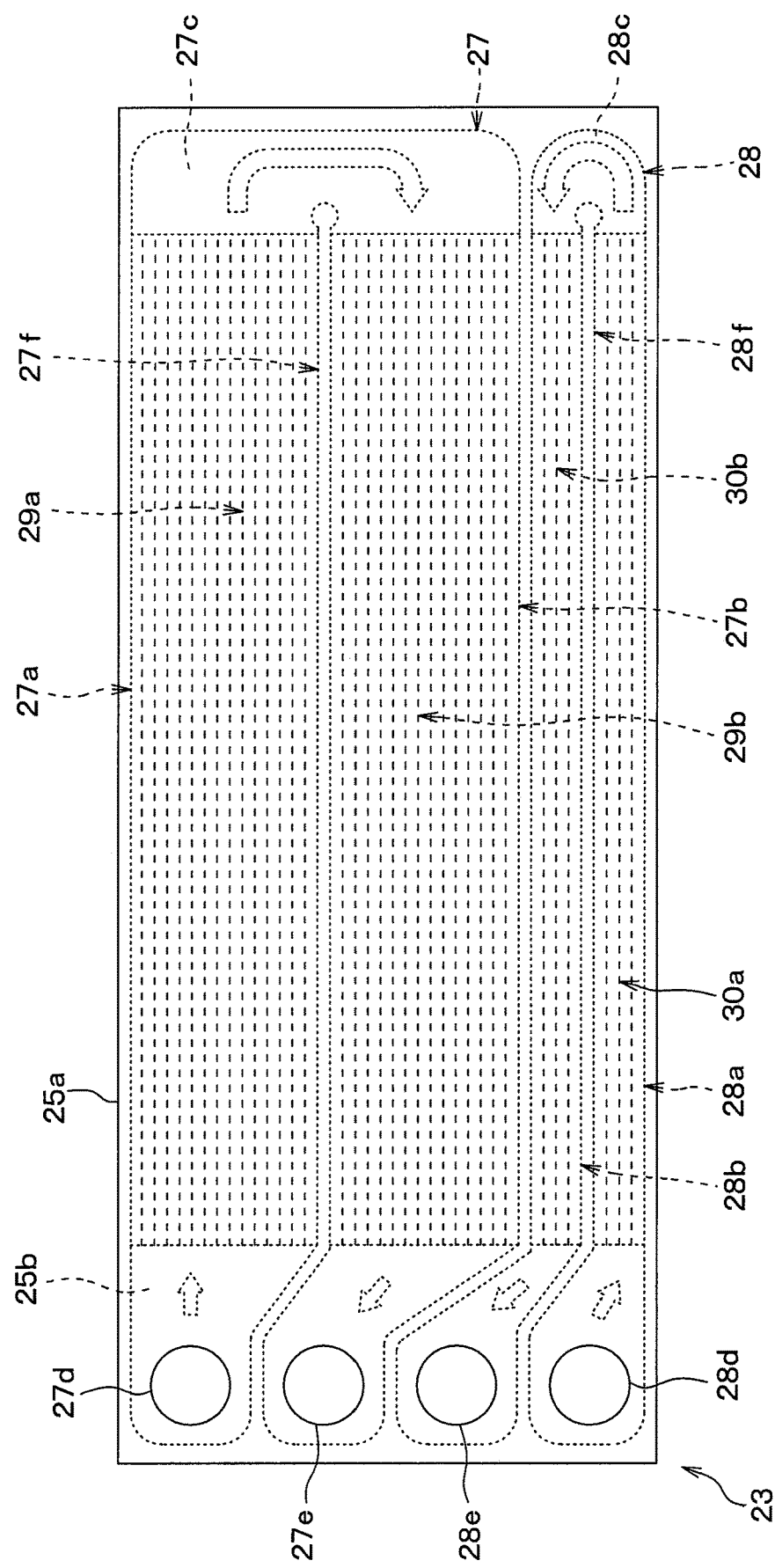
FIG. 16 is a perspective view of a plate of the flow path tube showing an internal structure of the flow path tube of a third embodiment.

FIG. 16 is a perspective view of the plate 25a of the flow path tube 23 showing the internal structure of the flow path tube 23 of the present embodiment.

In the heat exchange portion 28 of the flow path tube 23 of the present embodiment, the inlet 28d side from the U-turn portion 28c is located upstream of the outlet 28e side from the U-turn portion 28c with respect to the supercharged intake air. Therefore, the cooling water flow path 28a through which the first cooling water flows from the inlet 28d is located upstream, in the flow direction of the supercharged intake air, of the cooling water flow path 28b that leads the first cooling water to the outlet 28e.

Accordingly, the temperature of the supercharged intake air exchanging heat with the first cooling water flowing in the outlet 28e side of the cooling water flow path 28b becomes lower compared to a case where the inlet 28d side from the U-turn portion 28c of the heat exchange portion 28 is located downstream of the outlet 28e side from the U-turn portion 28c.

As a result, although the pressure of the first cooling water flowing through the outlet 28e side of the heat exchange portion 28 is reduced due to the inner fins 30a, 30b, boiling of the first cooling water is suppressed.

In addition to this, the pressure of the first cooling water flowing through the inlet 28d side of the heat exchanging portion 28 is higher than the pressure of the first cooling water flowing through the outlet 28e side of the heat exchange portion 28.

Therefore, the first cooling water flowing through the inlet 28d side of the heat exchange portion 28 exchanges heat with the supercharged intake air whose temperature is higher than "the supercharged intake air exchanging heat with the first cooling water flowing through the outlet 28e side of the cooling water flow path 28b". Nevertheless, the boiling of the first cooling water flowing through the inlet 28d side of the heat exchange portion 28 is suppressed.

According to the above-described present embodiment, it is possible to suppress the boiling of the first cooling water in the intercooler 20.

OTHER EMBODIMENTS (1) In the first embodiment, the first and second modifications, and the second and third embodiments, examples in which the water pumps 51, 61 are driven by the driving force output from the engine 10 have been described. However, as the water pumps 51, 61, an electric water pump may be used in which the impeller is driven by an electric motor.

(2) In the first embodiment, the first and second modifications, and the second and third embodiments, examples in which corrugated fins are used as the inner fins 29a, 29b, 30a, 30b have been described. However, instead of this, various types of fins (e.g., offset fins, louver fins) other than corrugated fins may be used as the inner fins 29a, 29b, 30a, 30b.

(3) In the first embodiment, the first and second modifications, and the second and third embodiments, examples in which one U-turn portion 28c is provided in the heat exchange portion 28 have been described, but instead of this, two or more U-turn portions 28c may be provided in the heat exchange portion 28. Alternatively, the U-turn portion 28c may not be provided and the heat exchange portion 28 in which the flow path extends linearly may be formed.

Similarly, examples in which one U-turn portion 27c is provided in the heat exchange portion 27 have been described, but instead of this, two or more U-turn portions 27c may be provided in the heat exchange portion 27. Alternatively, the U-turn portion 27c may not be provided and the heat exchange portion 27 in which the first cooling water flows linearly.

(4) In the first embodiment, the first and second modifications, and the second and third embodiments, examples where the heat exchange portion 28 is located upstream of the heat exchange portion 27 in the flow path tube 23. However, the heat exchange portion 28 may be provided downstream of the heat exchange portion 27 with respect to the flow direction of the supercharged intake air.

(5) In the first embodiment, the first and second modifications, and the second and third embodiments, the flow directions A, B of the second cooling water and the flow directions C, D of the first cooling water are perpendicular to the flow direction of the supercharged intake air. However, the flow direction A, B of the second cooling water and the flow directions C, D of the first cooling water may be any direction as long as they intersect with the flow direction of supercharged intake air.

The flow direction A of the second cooling water is a flow direction of the second cooling water in the first low-temperature cooling water flow paths, and the flow direction B of the second cooling water is a flow direction of the second cooling water in the second low-temperature cooling water flow paths. The flow direction C of the first cooling water is a flow direction of the first cooling water in the first high-temperature cooling water flow paths, and the flow direction D of the first cooling water is a flow direction of the first cooling water in the second high-temperature cooling water flow paths.

(6) In the first embodiment, the first and second modifications, and the second and third embodiments, examples in which the rib 41 is the protrusion portion of the plate 25a or the plate 25b are described. However, instead of this, the protrusions provided in the inner fins 30a, 30b may be the ribs 41.

(7) In the first embodiment, the first and second modifications, and the second and third embodiments, examples in which the heat exchange portions 27, 28 are defined by one flow path tube 23 are described. However, instead of this, the heat exchange portions 27, 28 may be constituted by independent flow path tubes.

(8) In the first embodiment, the first and second modifications, and the second and third embodiments, the peak portions 80 and the valley portions 81 are arranged alternately one by one in the direction perpendicular to the flow direction of the first cooling water. However, it is not limited to this, and it may be as follows.

That is, the angle at which "the direction in which the peak portions 80 and the valley portions 81 are aligned alternately one by one" intersects "the flow direction of the first cooling water" is not limited to right angle as long as "the direction in which the peak portions 80 and the valley portions 81 are aligned alternately one by one" intersects "the flow direction of the first cooling water" in the inner fin 30b.

(9) In the first embodiment, the first and second modifications, and the second and third embodiments, multiple ribs 41 are located downstream of the second high-temperature cooling water flow paths 71 with respect to the flow direction of the first cooling water. However, the ribs 41 may be provided upstream of the second high-temperature cooling water flow paths 71 with respect to the flow direction of the first cooling water.

(10) In the first embodiment, the first and second modifications, and the second and third embodiments, the U-turn portion 28c is provided in the heat exchange portion 28 as a turn portion. However, instead of this, a V-turn portion bending the flow path in a V shape may be provided as a turn portion.

(11) The present disclosure is not limited to the above-described embodiments, and can be appropriately modified. Individual elements or features of a particular embodiment are generally not limited to that particular embodiment, but, where applicable, are interchangeable and can be used in a selected embodiment, even if not specifically shown or described. Individual elements or features of a particular embodiment are not necessarily essential unless it is specifically stated that the elements or the features are essential in the foregoing description, or unless the elements or the features are obviously essential in principle. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Furthermore, a material, a shape, a positional relationship, or the like, if specified in the above-described example embodiments, is not necessarily limited to the specific shape, positional relationship, or the like unless it is specifically stated that the material, shape, positional relationship, or the like is necessarily the specific material, shape, positional relationship, or the like, or unless the shape, positional relationship, or the like is obviously necessary to be the specific shape, positional relationship, or the like in principle.

CONCLUSION

According to a first aspect described in some or all of the first embodiment, the first and second modifications, the second, third embodiments, and other embodiments, the intercooler for cooling the supercharged intake air supercharged to the engine by the supercharger has features described below. The intercooler includes a heat exchanger that has a first heat exchange portion through which a first heat exchange medium flows and a second heat exchange portion through which a second heat exchange medium whose temperature is lower than the first heat exchange medium flows. The first heat exchange medium flowing through the first heat exchange portion cools the supercharged intake air by exchanging heat with the supercharged intake air, and the second heat exchange medium flowing through the second heat exchange portion cools the supercharged intake air by exchanging heat with the supercharged intake air. The heat exchanger includes an inner fin configured to enhance the heat exchange between the supercharged intake air and the first heat exchange medium. The heat exchanger includes a boiling suppression portion configured to suppress a boiling of the first heat exchange medium flowing in an upstream part, in a flow direction of the supercharged intake air, of the first heat exchange portion.

According to a second aspect, the inner fin defines, in the first heat exchange portion, multiple flow paths through which the first heat exchange medium. A first flow path of the flow paths is located on an upstream side with respect to the flow direction of the supercharged intake air, and a second flow path of the flow paths is located on a downstream side with respect to the flow direction of the supercharged intake air. The boiling suppression portion includes a resistant body configured to cause a flow speed of the first heat exchange medium in the second flow path to be lower than a flow speed of the first heat exchange medium in the first flow path.

Accordingly, a temperature of the first heat exchange medium flowing through the first flow path can be lowered in comparison with a case where the flow speed of the first heat medium in the second flow path is at or above the flow speed of the first heat medium in the first flow path. Therefore, a boiling of the first heat exchange medium flowing through the first flow path can be suppressed. That is, the boiling of the first heat exchange medium flowing on the upstream side of the first heat exchange portion with respect to the supercharged intake air can be suppressed.

According to a third aspect, the heat exchanger includes a first plate and a second plate. One of the first plate and the second plate includes a recess portion. The first plate and the second plate are joined with each other such that another of the first plate and the second plate closes the recess portion to define the first heat exchange portion between the recess portion and the other of the first plate and the second plate. The resistant body is a rib provided in the first heat exchange portion, and the rib protrudes from one of the first plate and the second plate toward another of the first plate and the second plate to generate resistance to a flow of the first heat exchange medium.

According to a fourth aspect, the rib is provided in the first heat exchange portion and offset from the inner fin in a flow direction of the first heat exchange medium.

According to a fifth aspect, the heat exchanger includes a first plate and a second plate. One of the first plate and the second plate includes a recess portion. The first plate and the second plate are joined with each other such that another of the first plate and the second plate closes the recess portion to define the first heat exchange portion between the recess portion and the other of the first plate and the second plate. The inner fin includes multiple peak portions joined to the one of the first plate and the second plate, and multiple valley portions joined to the other of the first plate and the second plate. The inner fin has a corrugated shape in which the peak portions and the valley portions are arranged alternately one by one. The inner fin includes middle portions each of which is positioned between one of the peak portions and adjacent one of the valley portions. Flow paths through which the first heat exchange medium flows are defined between pairs of adjacent middle portions. A fin pitch is a distance between two adjacent middle portions. The boiling suppression portion includes the inner fin in which the fin pitch on an upstream side with respect to the flow direction of the supercharged intake air is larger than the fin pitch on a downstream side with respect to the flow direction of the supercharged intake air.

Accordingly, a flow rate of the first heat exchange medium in the first flow path can be larger than in a case where a flow path cross-sectional area of the first flow path is at or below that of the second flow path. According to this, a heat capacity of the first flow path can be larger than in a case where a flow path cross-sectional area of the first flow path is at or below that of the second flow path.

Therefore, the temperature of the first heat exchange medium flowing through the first flow path can be lowered. Therefore, a boiling of the first heat exchange medium flowing through the first flow path can be suppressed. That is, the boiling of the first heat exchange medium flowing on the upstream side of the first heat exchange portion with respect to the supercharged intake air can be suppressed.

According to a sixth aspect, in the heat exchanger, the first heat exchange portion is located upstream of the second heat exchange portion with respect to the flow direction of the supercharged intake air.

According to a seventh aspect, the heat exchanger includes an inlet through which the first heat exchange medium flows into the heat exchanger, and an outlet through which the first heat exchange medium flowing through the first heat exchange portion flows out of the heat exchanger. The first heat exchange portion includes a turn portion configured to cause the first heat exchange medium from the inlet to make a turn and guide the heat exchange medium toward the outlet.

According to an eighth aspect, the intercooler for cooling the supercharged intake air supercharged to the engine by the supercharger has features described below. The intercooler includes an inlet through which a first heat exchange medium flows into the heat exchanger, a first heat exchange portion through which the first heat exchange medium from the inlet flows, an outlet through which the first heat exchange medium flows out of the heat exchanger, and a second heat exchange portion through which a second heat exchange medium flows, a temperature of the second heat exchange medium being lower than a temperature of the first heat exchange medium. The first heat exchange medium flowing through the first heat exchange portion cools the supercharged intake air by exchanging heat with the supercharged intake air, and the second heat exchange medium flowing through the second heat exchange portion cools the supercharged intake air by exchanging heat with the supercharged intake air. The heat exchanger includes an inner fin configured to enhance the heat exchange between the supercharged intake air and the first heat exchange medium. The first heat exchange portion includes a turn portion configured to cause heat exchange medium from the inlet to make a turn and guide the heat exchange medium toward the outlet. An inlet side part of the first heat exchange portion with respect to the turn portion is located upstream, in a flow direction of the supercharged intake air, of an outlet side part of the first heat exchange portion.

What is claimed is:

1. An intercooler that cools supercharged intake air supercharged to an engine by a supercharger, the intercooler comprising:
a heat exchanger including
a first heat exchange portion through which a first heat exchange medium flows, and
a second heat exchange portion through which a second heat exchange medium flows, a temperature of the second heat exchange medium being lower than a temperature of the first heat exchange medium, wherein
the first heat exchange medium flowing through the first heat exchange portion cools the supercharged intake air by exchanging heat with the supercharged intake air,
the second heat exchange medium flowing through the second heat exchange portion cools the supercharged intake air by exchanging heat with the supercharged intake air,
the heat exchanger includes an inner fin configured to enhance the heat exchange between the supercharged intake air and the first heat exchange medium,
the heat exchanger includes a boiling suppression portion configured to suppress a boiling of the first heat exchange medium flowing in an upstream part, in a flow direction of the supercharged intake air, of the first heat exchange portion,
the inner fin defines, in the first heat exchange portion, a plurality of flow paths through which the first heat exchange medium flows,
a first flow path of the plurality of flow paths is located on an upstream side with respect to the flow direction of the supercharged intake air,
a second flow path of the plurality of flow paths is located on a downstream side with respect to the flow direction of the supercharged intake air, and
the boiling suppression portion includes a resistant body configured to cause a flow speed of the first heat exchange medium in the second flow path to be lower than a flow speed of the first heat exchange medium in the first flow path.

2. The intercooler according to claim 1, wherein
the heat exchanger includes a first plate and a second plate,
one of the first plate and the second plate includes a recess portion,
the first plate and the second plate are joined with each other such that another of the first plate and the second plate closes the recess portion to define the first heat exchange portion between the recess portion and the other of the first plate and the second plate,
the resistant body is a rib provided in the first heat exchange portion, and
the rib protrudes from one of the first plate and the second plate toward another of the first plate and the second plate to generate resistance to a flow of the first heat exchange medium.

3. The intercooler according to claim 2, wherein
the rib is provided in the first heat exchange portion and offset from the inner fin in a flow direction of the first heat exchange medium.

4. The intercooler according to claim 1, wherein
in the heat exchanger, the first heat exchange portion is located upstream of the second heat exchange portion with respect to the flow direction of the supercharged intake air.

5. The intercooler according to claim 1, wherein
the heat exchanger includes an inlet through which the first heat exchange medium flows into the heat exchanger, and an outlet through which the first heat exchange medium flowing through the first heat exchange portion flows out of the heat exchanger, and
the first heat exchange portion includes a turn portion configured to cause the first heat exchange medium from the inlet to make a turn and guide the heat exchange medium toward the outlet.

6. An intercooler that cools supercharged intake air supercharged to an engine by a supercharger, the intercooler comprising:
a heat exchanger including
a first heat exchange portion through which a first heat exchange medium flows, and
a second heat exchange portion through which a second heat exchange medium flows, a temperature of the second heat exchange medium being lower than a temperature of the first heat exchange medium, wherein
the first heat exchange medium flowing through the first heat exchange portion cools the supercharged intake air by exchanging heat with the supercharged intake air,
the second heat exchange medium flowing through the second heat exchange portion cools the supercharged intake air by exchanging heat with the supercharged intake air,
the heat exchanger includes an inner fin configured to enhance the heat exchange between the supercharged intake air and the first heat exchange medium,
the heat exchanger includes a boiling suppression portion configured to suppress a boiling of the first heat exchange medium flowing in an upstream part, in a flow direction of the supercharged intake air, of the first heat exchange portion,
the heat exchanger includes a first plate and a second plate,
one of the first plate and the second plate includes a recess portion,
the first plate and the second plate are joined with each other such that another of the first plate and the second plate closes the recess portion to define the first heat exchange portion between the recess portion and the other of the first plate and the second plate,
the inner fin includes
a plurality of peak portions joined to the one of the first plate and the second plate, and
a plurality of valley portions joined to the other of the first plate and the second plate,
the inner fin has a corrugated shape in which the plurality of peak portions and the plurality of valley portions are arranged alternately one by one,
the inner fin includes middle portions each of which is positioned between one of the plurality of peak portions and adjacent one of the plurality of valley portions,
a plurality of flow paths through which the first heat exchange medium flows are defined between pairs of adjacent middle portions,
a fin pitch is a distance between two adjacent middle portions, and
the boiling suppression portion includes the inner fin in which the fin pitch on an upstream side with respect to the flow direction of the supercharged intake air is larger than the fin pitch on a downstream side with respect to the flow direction of the supercharged intake air.

7. An intercooler that cools supercharged intake air supercharged to an engine by a supercharger, the intercooler comprising:
a heat exchanger including
a first heat exchange portion through which a first heat exchange medium flows, and
a second heat exchange portion through which a second heat exchange medium flows, a temperature of the second heat exchange medium being lower than a temperature of the first heat exchange medium, wherein
the first heat exchange portion is configured to cool the supercharged intake air by exchanging heat between the supercharged intake air and the first heat exchange medium,
the second heat exchange portion is configured to cool the supercharged intake air by exchanging heat between the supercharged intake air and the second heat exchange medium,
the heat exchanger includes an inner fin configured to enhance the heat exchange between the supercharged intake air and the first heat exchange medium,
the heat exchanger includes a boiling suppression portion configured to suppress a boiling of the first heat exchange medium flowing in an upstream part, in a flow direction of the supercharged intake air, of the first heat exchange portion,
the inner fin defines, in the first heat exchange portion, a plurality of flow paths through which the first heat exchange medium flows,
a first flow path of the plurality of flow paths is located on an upstream side with respect to the flow direction of the supercharged intake air,
a second flow path of the plurality of flow paths is located on a downstream side with respect to the flow direction of the supercharged intake air, and
the boiling suppression portion includes a resistant body configured to cause a flow speed of the first heat exchange medium in the second flow path to be lower than a flow speed of the first heat exchange medium in the first flow path.

\* \* \* \* \*